United States Patent [19]

Skoultchi

[11] 4,052,244

[45] Oct. 4, 1977

[54] RAPID CURING TWO PART ADHESIVE

[75] Inventor: Martin M. Skoultchi, Somerset, N.J.

[73] Assignee: National Starch and Chemical Corporation, Bridgewater, N.J.

[21] Appl. No.: 715,529

[22] Filed: Aug. 18, 1976

[51] Int. Cl.$^2$ .............................. B32B 7/00; C09J 5/04
[52] U.S. Cl. .................................. 156/310; 156/314; 156/332; 156/316; 252/426; 427/302; 428/420; 428/463; 428/442; 428/522; 526/146; 526/328
[58] Field of Search ............. 156/310, 331, 314, 332, 156/316, 334; 427/407 R, 407 A, 333, 340, 302, 419 G; 428/420, 463, 442, 522; 526/118, 319, 123, 320, 146, 90, 328; 252/426, 431 R

[56] References Cited

U.S. PATENT DOCUMENTS

| 2,846,418 | 8/1958 | Bredereck et al. | 526/123 |
|---|---|---|---|
| 2,894,932 | 7/1959 | Bäder et al. | 156/332 |
| 2,928,804 | 3/1960 | Foster et al. | 156/310 |
| 3,046,262 | 7/1962 | Krieble | 156/332 |
| 3,125,480 | 3/1964 | Karo et al. | 156/310 |
| 3,489,599 | 1/1970 | Krieble | 428/463 |
| 3,634,379 | 1/1972 | Hauser | 526/319 |
| 3,658,624 | 4/1972 | Lees | 156/310 |
| 3,837,963 | 9/1974 | Frauenglass et al. | 156/310 |

*Primary Examiner*—Charles E. Van Horn
*Assistant Examiner*—J. J. Gallagher
*Attorney, Agent, or Firm*—Edwin Szala; Ellen T. Dec

[57] ABSTRACT

A two part adhesive composition characterized by rapid curing and long shelf life is disclosed. The adhesive composition comprises a first component of an acrylic monomer and saccharin or copper saccharinate and a second component comprising a p-toluenesulfinic acid salt which functions as an activator therefor.

10 Claims, No Drawings

RAPID CURING TWO PART ADHESIVE

BACKGROUND OF THE INVENTION

I. Field of the Invention

The present invention is directed to a two part adhesive system characterized by rapid curing and long shelf life as well as to a process for the adhesive bonding of surfaces therewith.

II. Brief Description of the Prior Art

Multi-part ethylenically unsaturated adhesive systems useful for rapidly bonding surfaces are known in the art. Most of these systems are based on the use of polymerization accelerators which are used to increase the rate of cure of the unsaturated monomeric base. Until recently, however, it has been difficult to obtain a stable, innocuous accelerator system for acrylate-based adhesive systems. The latter systems are desirable for their ease and flexibility in formulation and application as well as for the desirable tensile strength and heat resistant properties of the cured bond. U.S. Pat. Nos. 3,591,438 to Inback et al. and 3,616,040 to Toback present multi-part adhesive systems comprising a peroxy-catalyzed acrylate monomer and an accelerating agent containing an aldehyde-amine condensation product.

SUMMARY OF THE INVENTION

I have now found that acrylic-based adhesive compositions characterized by rapid curing and extended shelf-life may be prepared by catalyzing an acrylic monomer with the inter-reaction mixture of copper salts, saccharin and p-toluenesulfinic acid salts. The novel adhesives of the present invention are characterized as two part adhesive systems comprising (a) the adhesive base and (b) an activator therefor. More specifically, part (a) of the novel adhesive comprises the acrylic monomer and saccharin present in the form of saccharin or the copper salt of saccharin or a mixture thereof. Part (b) of the system comprises the copper salt of p-toluenesulfinic acid when only saccharin is used in part (a) and is any salt of p-toluenesulfinic acid when the copper salt of saccharin is present in part (a).

When curing is desired, the two separate components are applied to the surfaces to be bonded and, when the surfaces are joined, produce the required copper-saccharin-p-toluenesulfinic acid salt inter-reaction mixture thereby catalyzing the polymerization of the acrylic monomer.

The catalytic effects of the copper-containing system in the present invention are surprising and unexpected in view of the teachings of the prior art. Thus, references such as U.S. Pat. No. 2,370,010 teach that while small amounts of copper (e.g. on the order of less than 3 parts per million) are known to act as accelerators in some polymerization systems, the presence of amounts of copper in excess of about 5 parts per million have been shown to exhibit inhibitory effects on the polymerization rate, and may in fact, totally inhibit the polymerization reaction at higher levels.

An additional embodiment of the present invention includes a process for bonding surfaces comprising the steps of (1) applying to at least one of such surfaces the adhesive base described above as part (a); (2) applying to at least one of such surfaces the activator described above as part (b); and (3) placing the surfaces so treated in abutting relation until the adhesive composition polymerizes and bonds the surfaces together.

DETAILED DESCRIPTION OF THE PREFERRED EMBODIMENTS

The preferred polymerizable monomers used in part (a) of the present invention are the monofunctonal hydroxysubstituted acrylates and methacrylates characterized by the formula:

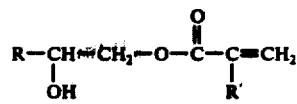

wherein

R is hydrogen, phenyl, methyl, ethyl or $C_1$-$C_{18}$ alkoxymethyl and

R' is hydrogen or methyl.

Such monomers include hydroxyethyl acrylate, hydroxypropyl acrylate, 2-hydroxybutyl acrylate as well as the corresponding methacrylates.

In addition to those monomers represented above, other useful monomers are other monofunctonal acrylate esters and the amide, cyano, chloro and silane substituted derivatives thereof such as methyl acrylate, methyl methacrylate, ethyl acrylate, ethyl methacrylate, butyl acrylate, n-octyl acrylate, 2-ethylhexyl acrylate, decylmethacrylate, dodecyl methacrylate, cyclohexyl methacrylate, tert-butyl methacrylate, acrylamide, acrylonitrile, N-methylolacrylamide, diacetone acrylamide, N-tertbutyl acrylamide, N-tert-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

Difunctional acrylates are also useful herein and include those corresponding to the general formula:

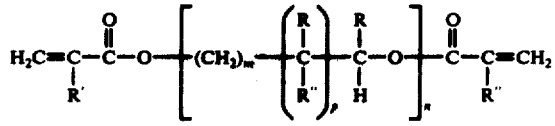

wherein

R is selected from the group consisting of hydrogen, methyl, ethyl,

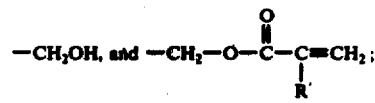

R' is selected from the group consisting of hydrogen, chlorine, methyl and ethyl;

R" is selected from the group consisting of hydrogen, hydroxy, and

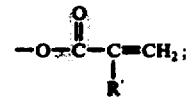

m is an integer equal to at least 1, e.g, from 1 to 8 or higher and preferably from 1 to 4 inclusive;

n is an integer equal to at least 1, e.g., from 1 to 20 or more; and p is one of the following: 0 or 1.

Monomers useful in this invention and which come within the above general formula include, for example, ethylene glycol dimethacrylate, ethylene glycol diacrylate, polyethylene glycol diacrylate, dimethacrylic ester of tetraethylene glycol, diglycerol diacrylate, diethylene glycol dimethacrylate, pentaerythritol triacrylate, and other polyester diacrylates and dimethacrylates.

The above class of monomers is in essence described in U.S. Pat. No. 3,043,820 issued July 10, 1962 (to R. H. Krieble).

Other difunctional polymerizable monomers useful in my compositions correspond to the general formula:

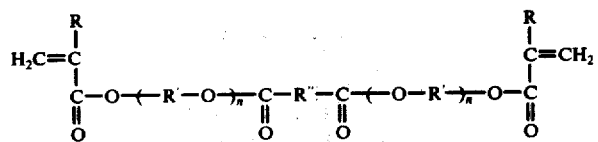

wherein
R represents hydrogen, chlorine, methyl or ethyl,
R' represents alkylene with 2-6 carbon atoms,
R" represents $(CH_2)_m$ in which $m$ is an integer of from 0 to 8,

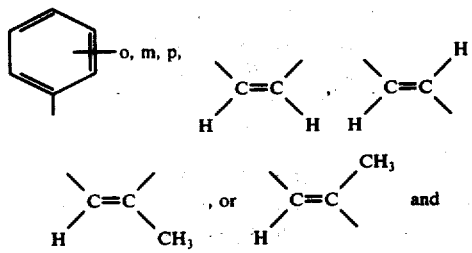

$n$ represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) malonate, dimethacrylate of bis(tetraethylene glycol) sebacate, dimethacrylate of bis(ethylene glycol) phthalate, dimethacrylates of bis(tetraethylene glycol) maleate, and the diacrylates and α-chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanate-hydroxyacrylate or isocyanate-aminoacrylate reaction products which may be characterized as acrylate terminated polyurethanes and polyureides or polyureas. These monomers correspond to the general formula:

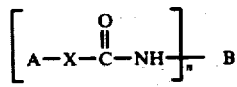

wherein
X is selected from the group consisting of —O— and

and
R is member selected from the group consisting of hydrogen and lower alkyl of 1 to 7 carbon atoms;
A represents the organic residue of an active hydrogen containing acrylic ester wherein the active hydrogen has been removed, the ester being hydroxy or amino substituted on the alkyl portion thereof and the methyl, ethyl and chlorine homologs thereof;
$n$ is an integer from 1 to 6 inclusive; and B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example hydroxyethyl methacrylate.

The above class of monomers is in essence described in U.S. Pat. No. 3,425,988 issued Feb. 4, 1969 ) Loctite Corporation).

Another class of monomers useful in the present application are the mono- and polyacrylate and methacrylate esters of bisphenol type compounds. These monomers may be described by the formula:

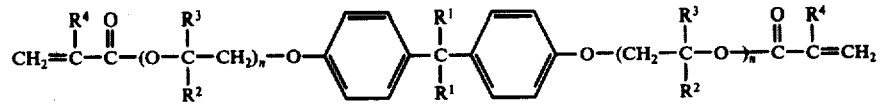

where
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl and
$n$ is an integer having a value of 0 to 8.

Representative monomers of the above-described class include: dimethacrylate and diacrylate esters of 4,4'-bishydroxy-ethoxy-bisphenol A; dimethacrylate and diacrylate esters of bisphenol A; etc. These monomers are essentially described in Japanese Patent Publication 70-15640 to Toho Chemical Manuf. Ltd.

The monomers useful herein are thus seen to be polymerizable monomers having one or more acrylate or methacrylate groups as a common, unifying characteristic, and for convenience may be generically termed acrylic and substituted acrylic monomers.

In preparing this component of the adhesive system, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomer such as unsaturated hydrocarbons, unsaturated esters and ethers, vinyl esters and the like. Typical optional comonomers may therefore include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic polymerizable comonomer(s) may be added to constitute up to about 60%, by weight, of the monomer composition. Preferably, however, the optional non-acrylic comonomer will constitute no more than 50%, by weight, of the monomer composition, and most preferably, it will constitute no more than 30%, by weight, of the monomer composition.

It is also to be noted in selecting the acrylate monomer of component (a) that the choice thereof will also affect the bond strength of the resultant cured polymer. Thus, in order to maintain or increase the bond strength of the cured polymer, it may be preferred to use an acrylate monomer having an alcoholic or other relatively polar group substituted thereon. Examples of such polar groups in addition to the hydroxy group include, amino, amido, cyano, mercapto, and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

Where the effect of a polar substituted monomer is desired without its actual use, in some instances a small amount (usually no more than 87%, by weight of the total composition) of an alkanol may be admixed to the composition. Such useful alkanols include, for example, methanol, ethanol, isopropanol, butanol, etc. While analogous mercapto compounds may be used in place of the alkanols with a comparable beneficial effect, their use if not favored mainly because of their unpleasant, strong odor.

It is understood that the various monomers and comonomers useful herein are not required to be in a highly purified state. The monomers or comonomers may be comprised of commercial grades in which inhibitors, stabilizers, or other additives or impurities may be present, as well as those prepared on the laboratory or in pilot plant scale.

Part (a) of the adhesive system also contains saccharin. The saccharin component may either be present as saccharin or as the coppe salt of saccharin or as a mixture thereof. Alternatively, the copper salt may be formed in situ from free copper ions and excess saccharin. The saccharin component is generally present in amounts of from 0.01 to 10% by weight of the monomer or to the limit of solubility of the material in the monomer. Preferably, the saccharin component will be present in amounts of 0.1 to 5% by weight of the monomer. Generally, the higher the concentration of free saccharin in the system, the more rapid the rate of cure.

In order to prepare part (a) of the adhesive composition of the present invention, it is merely necessary to mix the desired amount of the saccharin component with the selected acrylic monomer or monomers which may optionally contain non-acrylic copolymerizable monomers. The optional ingredients can be premixed into the monomer or alternatively admixed into the prepared composition.

One of the advantages of the present system is that part (a) does not require a solvent since the saccharin or its copper salt is usually soluble in the monomer. If, however, the presence of a solvent is desired, then any solvent which dissolves the saccharin or copper salt of saccharin and is itself soluble in the monomer may be employed. Common solvents are described in the literature and include, for example, alkanols such as methanol, ethanol, butanol and substituted and unsubstituted formamides such as formamide and N,N-dimethyl formamide.

Part (b) of the two part adhesive system of the present invention comprises at least one salt of p-toluene-sulfinic acid. If the saccharin of part (a) is present only in the form of saccharin, then the salt of part (b) must be the copper salt of p-toluene-sulfinic acid. When copper saccharinate is present in part (a), the salt of part (b) may be the copper salt or any other salt of the p-toluene-sulfinic acid. Suitable other salts included the amine, quaternary ammonium and alkali metal salts. A few of these salts, e.g. the amines may occur as liquids and may be used directly as component (b) of the adhesive. The remaining salts are utilized in a suitable solvent such as lower alkanols, chlorinated alkanes or alkenes, ketones, etc. and are preferably present in a concentration of about 0.001 to 5% by weight of the solvent.

Optionally, either of the components of the adhesive system may also contain a minor amount, up to 50% by weight, of a polymeric additive, for example, a low or high molecular weight polymer or prepolymer. Illustrative of such polymeric additives are methacrylate polymers such as sold by E. I. DuPont under the trademark ELVACITE, or soluble or dispersible synthetic elastomers. Additionally, in order to further modify the properties of the compositions, they may also contain plasticizers such, for example, as dibutyl phthalate or triethylene glycol. Other optional ingredients include thickeners, organic and inorganic fillers, cut glass fibers, dyes, ultraviolet fluorescent dyes, fluorescent brighteners, etc.

The two components of the adhesive system may be applied to the surfaces to be bonded using any of the conventional methods such as brushing, dipping, casting, spraying, etc. It will be apparent that in most instances the preferred method of application is by spraying since this results in the production of a thin, uniform film of the adhesive component and/or activator on the surface while maximinizing the rate of solvent vaporization. This latter method is particularly preferred for the application of the activator component of the system.

The amount of the activator component employed should be sufficient to ensure efficient acceleration of the compositions during curing. Generally, amounts of activator equal to about 0.001 to about 1.0 percent by weight of the acrylic monomer are sufficient and amounts in substantive excess thereof will be unnecessary and may even adversely affect the strength of the final bond. While it is not easy to determine the amount of activator applied to a given surface, adequate results are obtained with a single application by aerosol or otherwise of a thin film of the activator component to at least one of the surfaces to be bonded.

The adhesive acrylate component, designated part (a), can be applied either to the surface which has been treated with the activator or to the appropriate mating surface. The bonding operation is then carried out in a conventional manner by placing the two mating surfaces in abutting relationship and applying a moderate compressive force, if desired, to produce a relatively thin layer of adhesive between the two surfaces. A final adhesive thickness of from 0.01 to 0.15 mm. is preferred when using the adhesives of the present invention.

The compositions of this invention will then cure at ambient temperatures or heat may be used to even further accelerate the rate of curing. Compositions containing significant amounts of hydroxy substituted acrylic monomer are further cross-linked by the application of heat resulting in increased bond strength.

The following examples will further describe and illustrate the practice of this invention but they are not intended to limit its scope. In these examples, all parts are given by weight unless otherwise noted.

EXAMPLES

A. Preparation of the Copper Salt of Saccharin

A solution of 17.0 g. cupric chloride dihydrate in 300 ml water was mixed with a solution of 48.2 g. sodium saccharin in 200 ml water. A blue crystalline salt of cupric saccharin rapidly formed. It was filtered, washed several times with water and dried. Yield was essentially quantitative.

B. Preparation of Cupric p-toluenesulfinate

An aqueous solution containing 17.0 g. cupric chloride dihydrate in 300 ml water was added with vigorous stirring to a solution containing 42.8 g. sodium p-toluenesulfinate dihydrate in 200 ml water. A light green precipitate of the product formed immediately. The product was filtered, washed and air-dried. Yield was quantative.

EXAMPLE 1 - 14

The monomers used in the following examples are designated in Table I.

TABLE I

| | |
|---|---|
| A | Hydroxyethyl acrylate |
| B | Hydroxyethyl methacrylate |
| C | Hydroxypropyl acrylate |
| D | Butyl acrylate |
| E | Ethyleneglycol diacrylate |
| F | Diethyleneglycol dimethacrylate |
| G | Triethyleneglycol dimethacrylate |
| H | 2-Ethylhexyl acrylate |
| J | Reaction product of 2 moles hydroxyethyl acrylate and 1 mole toluene diisocyanate |
| K | Dimethacrylate ester of bis (ethyleneglycol) adipate |
| L | Dimethacrylate ester of bisphenol A |

Adhesive base formulations were prepared using at least one of the monomers of Table I together with at least one saccharin component. The adhesive base was then applied to one surface of a glass substrate to be bonded.

Table II

| | Adhesive Base | | | Activator Cure Time | |
|---|---|---|---|---|---|
| Ex. No. | Monomer | % Copper Salt of Saccharin | % Saccharin | Activator (*see below) | (Sec.) |
| 1 | A | — | 5% | (a)[(1)] | 5 |
| 2 | C | — | 2% | (a) | 10 |
| 3 | A | 0.1% | 2% | (b) | 30 |
| 4 | B | 0.2% | 2% | (b) | 20 |
| 5 | E | 0.5% | 2% | (b) | 25 |
| 6 | C | 1.0% | 2% | (b) | 10 |
| 7 | D | 1.0% | 2% | (c) | 90 |
| 8 | 60% D 40% H | 0.5% | 0.5% | (c) | 160 |
| 9 | C | 1.0% | — | (b) | 20 |
| 10 | F | 0.5% | 0.5% | (b) | 15 |
| 11 | G | 0.5% | 0.5% | (b) | 15 |
| 12 | 50% J 50% B | 0.5% | 0.5% | (b) | 35 |
| 13 | 20% K 80% B | 0.5% | 0.5% | (b) | 45 |
| 14 | 70% L 30% B | 0.5% | 0.5% | (b) | 65 |

*(a) cupric salt of p-toluenesulfinic acid
(b) sodium salt of p-toluenesulfinic acid
(c) benzyltriethyl ammonium salt of p-toluenesulfinic acid
[(1)] In Example 1, the activator was used in the form of a 2% solution in methanol. In the remaining examples, the activator was used in the form of a 1% solution in methanol.

The activator, in the form of a solution in methanol, was sprayed on another glass surface. After evaporation of the solvent the two surfaces were joined. The "cure time", i.e. time required to prevent movement of the two surfaces by hand, was then determined. Table II shows the various formulations employed and the resulting "cure times".

EXAMPLE 15

In formulations similar to those used in Examples 1-14, various copolymers were prepared using a mixture of the acrylate monomer and acrylic acid. The formulations and curing times are shown in Table III. All systems contained 0.5% Cu saccharin and 0.5% saccharin in part (a) and used a 1% solution of sodium salt of p-toluenesulfinic acid in methanol as activator.

TABLE III

| Monomer | % Acrylic Acid | Cure Time |
|---|---|---|
| A | 1% | 20 Sec. |
| C | 5% | 25 Sec. |
| G | 10% | 35 Sec. |

EXAMPLE 16

Monomer polymer syrups were prepared and cured in accordance with the procedures used in Example 1-14. All formulations contained 0.5% copper saccharinate and 0.5% saccharin in the hydroxypropyl acrylate polymer syrup and used a 1% solution of the sodium salt of p-toluenesulfinic acid in methanol as the activator. The formulations and approximate curing times are shown in Table IV.

TABLE IV

| % Hydroxypropyl Acrylate | % Polymer Additive | Cure Time |
| --- | --- | --- |
| 60% | 40% Acrylic Rubber (Hycar 4041) | 4 Min. |
| 70% | 30% Polyester (Dupont 49001) | 2¼ Min. |
| 90% | 10% Polyester-urethane (Rucothane P 279) | 2 Min. |

As will be recognized by those skilled in the art, the foregoing examples are merely exemplary. Variations may be made in ingredients, proportions and procedures as long as such variations are within the scope and spirit of the following claims.

I claim:

1. A two part adhesive composition consisting essentially of an adhesive base and an activator therefor wherein the adhesive base comprises an acrylic monomer and a saccharin component selected from the group consisting of saccharin, the copper salt of saccharin and mixtures thereof, said saccharin component being present in an amount of 0.01 to 10% by weight of the monomer; and the activator comprises the copper salt of p-toluenesulfonic acid when only saccharin is used in the adhesive base and is a salt of p-toluenesulfinic acid when the copper salt of saccharin is present in the adhesive base.

2. The adhesive composition of claim 1 wherein the acrylic monomer of the adhesive base is a member of the group consisting of compounds of the formula:

(i)

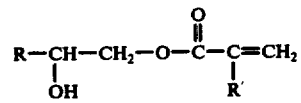

wherein
R is selected from the group consisting of hydrogen, phenyl, methyl, ethyl or $C_1$-$C_{18}$ alkoxymethyl and
R' is hydrogen or methyl;

ii. monofunctional acrylate and methacrylate esters and the amide, cyano, chloro and silane substituted derivatives thereof;

(iii)

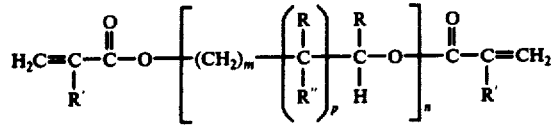

wherein
R is selected from the group consisting of hydrogen, methyl, ethyl,

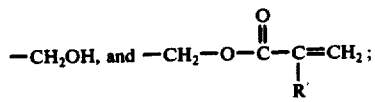

R' is selected from the group consisting of hydrogen, chlorine, methyl and ethyl;
R" is selected from the group consisting of hydrogen, hydroxy, and

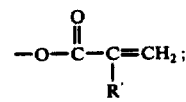

$m$ is an integer equal to at least 1;
$n$ is an integer equal to at least 1; l and
$p$ is 0 or 1;

(iv)

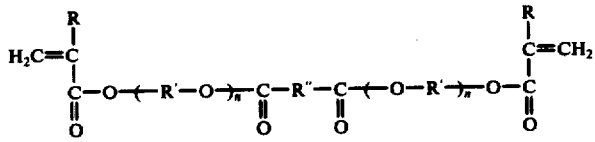

wherein
R is hydrogen, chlorine, methyl or ethyl,
R' is alkylene with 2-6 carbon atoms,
R" is selected from the group consisting of $(CH_2)_m$ in which $m$ is an integer of from 0 to 8,

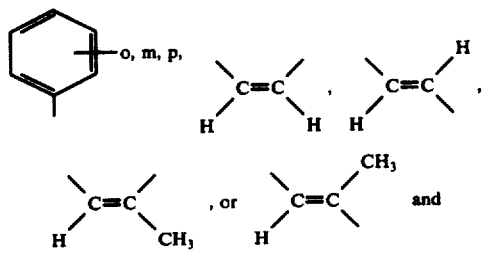

$n$ is an integer of from 1 to 4;

(v)

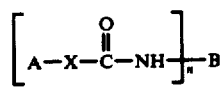

wherein
X is selected from the group consisting of 'O— and

R is selected from the group consisting of hydrogen and lower alkyl of 1 to 7 carbon atoms;
A is the organic residue of an active hydrogen containing acrylic ester wherein the active hydrogen has been removed, the ester being hydroxy or amino substituted on the alkyl portion thereof, and the methyl, ethyl and chlorine homologs thereof;
$n$ is an integer from 1 to 6 inclusive; and B is mono- or polyvalent organic radical selected from the group consisting of alkyl, alkylene, alkenylene, cycloalkyl, cycloalkylene, aryl, aralkyl, alkaryl, poly(carboalkoxyalkylene), and heterocyclic radicals both substituted and unsubstituted;

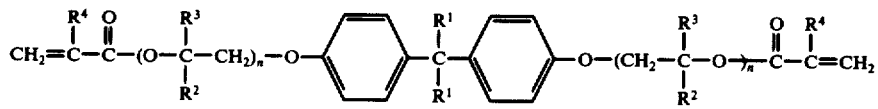

where
- $R^1$ is selected from the group consisting of methyl, ethyl, carboxyl or hydrogen;
- $R^2$ is selected from the group consisting of hydrogen, methyl or ethyl;
- $R^3$ is selected from the group consisting of hydrogen, methyl or hydroxyl;
- $R^4$ is selected from the group consisting of hydrogen, chlorine, methyl or ethyl; and
- $n$ is an integer having a value of 0 to 8.

3. The composition of claim 1 wherein the acrylic monomer is polymerizable hydroxyethyl acrylate or polymerizable hydroxyethyl methacrylate.

4. The composition of claim 1 wherein there is present in the adhesive base up to 60% by weight of at least one nonacrylic polymerizable comonomer.

5. The composition of claim 1 wherein the activator is employed in an amount equal to 0.001 to 1.0 percent by weight of the acrylic monomer.

6. A process for bonding surfaces comprising the steps of:
1. applying to at least one of such surfaces an adhesive bse consisting essentially of an acrylic monomer and a saccharin component selected from the group consisting of saccharin, the copper salt of saccharin and mixture thereof, said saccharin component being present in an amount of 0.01 to 10% by weight of the monomer;
2. applying to at least one of such surfaces an activator comprising the copper salt of p-toluenesulfinic acid when only saccharin is used in the adhesive base and a salt of p-toluenesulfonic acid when the copper salt of saccharin is present in the adhesive base; and
3. placing the surfaces so treated in abutting relation until the adhesive composition polymerizes and bonds the surfaces together.

7. The process of claim 6 wherein the acrylic monomer of the adhesive base is a member of the group consisting of compounds of the formula:

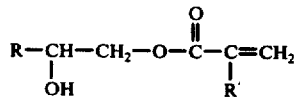

(i)

wherein

R is selected from the group consisting of hydrogen, phenyl, methyl, ethyl or $C_1 - C_{18}$ alkoxymethyl and R' is hydrogen or methyl;

ii. monofunctional acrylate and methacrylate esters and the amide, cyano, chloro and silane substituted derivatives thereof;

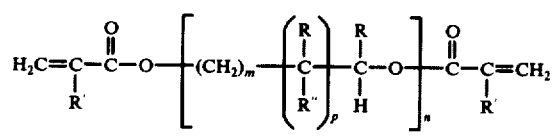

(iii)

wherein
R is selected from the group consisting of hydrogen, methyl, ethyl,

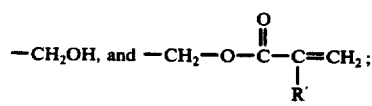

R' is selected from the group consisting of hydrogen, chlorine, methyl and ethyl;
R" is selected from the group consisting of hydrogen hydroxy, and

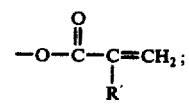

$m$ is an integer equal to at least 1;
$n$ is an integer equal to at least 1; and
$p$ is 0 or 1;

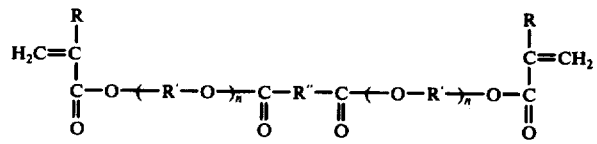

(iv)

wherein
R is hydrogen, chlorine, methyl or ethyl,
R' is alkylene with 2-6 carbon atoms,
R" is selected from the group consisting of $(CH_2)_m$ in which $m$ is an integer of from 0 to 8,

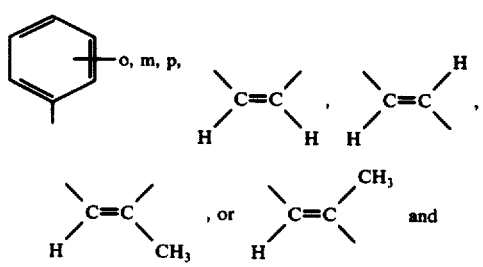

$n$ is an integer of from 1 to 4;

(v)

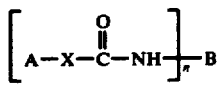

wherein

X is selected from the group consisting of —O— and

R is selected from the group consisting of hydrogen and lower alkyl of 1 to 7 carbon atoms;

A is the organic residue of an active hydrogen containing acrylic ester wherein the active hydrogen has been removed, the ester being hydrogen or amino substituted on the alkyl portion thereof, and the methyl, ethyl and chlorine homologs thereof;

$n$ is an integer from 1 to 6 inclusive; and

B is a mono- or polyvalent organic radical selected from the group consisting of alkyl, alkylene, alkenylene, cycloalkyl, cycloalkylene, aryl, aralkyl, alkaryl, poly(carboalkoxyalkylene), and heterocyclic radicals both substituted and unsubstituteed;

(vi)

where $R^1$ is selected from the group consisting of methyl, ethyl, carboxyl or hydrogen;

$R^2$ is selected from the group consisting of hydrogen, methyl, or ethyl;

$R^3$ is selected from the group consisting of hydrogen, methyl or hydroxyl;

$R^4$ is selected from the group consisting of hydrogen, chlorine, methyl or ethyl; and $n$ is an integer having a value of 0 to 8.

8. The process of claim 6 wherein the acrylic monomer is polymerizable hydroxyethyl acrylate or polymerizable hydroxyethyl methacrylate.

9. The process of claim 6 wherein there is present in the adhesive base up to 60% by weight of at least one non-acrylic polymerizable comonomer.

10. The process of claim 6 wherein the activator is employed in an amount equal to 0.001 to 1.0 percent by weight of the acrylic monomer.

* * * * *